(12) United States Patent
Samy et al.

(10) Patent No.: US 11,060,635 B2
(45) Date of Patent: Jul. 13, 2021

(54) ADDITIVELY MANUFACTURED CONTROL VALVE FLOW ELEMENT

(71) Applicant: Control Components, Inc., Rancho Santa Margarita, CA (US)

(72) Inventors: Sekhar Samy, Rancho Santa Margarita, CA (US); Uzair Ahmed, Rancho Santa Margarita, CA (US)

(73) Assignee: CONTROL COMPONENTS, INC., Rancho Santa Margarita, CA (US)

( * ) Notice: Subject to any disclaimer, the term of this patent is extended or adjusted under 35 U.S.C. 154(b) by 0 days.

(21) Appl. No.: 16/597,662

(22) Filed: Oct. 9, 2019

(65) Prior Publication Data
US 2021/0108739 A1   Apr. 15, 2021

(51) Int. Cl.
*F16K 47/08* (2006.01)

(52) U.S. Cl.
CPC .................................. *F16K 47/08* (2013.01)

(58) Field of Classification Search
CPC ........ F16K 47/04; F16K 47/08; F16L 55/055; F16L 55/027; F16L 55/02763; F16L 55/02754
See application file for complete search history.

(56) References Cited

U.S. PATENT DOCUMENTS

| | | |
|---|---|---|
| RE32,197 E | 7/1986 | Self |
| 6,851,658 B2 * | 2/2005 | Fitzgerald ............... F16K 3/243 251/282 |
| 6,868,865 B2 | 3/2005 | Tran |
| 8,312,893 B2 | 11/2012 | Bey et al. |
| 8,826,938 B2 | 9/2014 | Moore |
| 8,998,169 B2 | 4/2015 | Kaegi |
| 2009/0026395 A1 * | 1/2009 | Perrault ................. F16K 47/08 251/127 |
| 2016/0215900 A1 | 7/2016 | Kubota et al. |
| 2017/0350513 A1 * | 12/2017 | Shen ....................... F16K 1/38 |

OTHER PUBLICATIONS

International Search Report and Written Opinion for PCT/US2020/053775; dated Dec. 10, 2020.

* cited by examiner

*Primary Examiner* — Michael R Reid
(74) *Attorney, Agent, or Firm* — Stetina Brunda Garred and Brucker; Mark B. Garred

(57) ABSTRACT

A valve for regulating the flow of a fluid includes a housing defining a fluid inlet and a fluid outlet. A flow control element is disposed within the housing and is configured to dissipate energy in a fluid flowing therethrough from the fluid inlet to the fluid outlet. A valve seat is positioned within the housing and includes a plurality of vortex generators which induce vortices in the fluid as the fluid flows through the valve seat. A plug is disposed within the housing and is moveable relative thereto between closed and open positions. The plug moves away from the valve seat as the plug moves from the closed position toward the open position such that fluid flow through the flow control element and the valve seat increases as the plug is moved from the closed position toward the open position.

12 Claims, 5 Drawing Sheets

Counter-rotating

Co-rotating

ADDITIVELY MANUFACTURED CONTROL VALVE FLOW ELEMENT

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to a fluid control valve, and more specifically to a fluid control valve formed via additive manufacturing, and having attributes which aid in thermal management, as well as providing strength using a lightweight design.

2. Description of the Related Art

The handling of flowing fluids at high pressure may entail the use of control devices to attain energy loss or high pressure drops. However, the extreme conditions of the fluid flowing through such control devices may result in erosion in the control device due to cavitation, which may refer to high speed implosion of fluid against the components of the control device. Erosion of the control device may reduce the effectiveness in its ability to attain the desired energy loss or high pressure drops.

In addition to the erosion issues, the high pressure and high velocity flow of the fluid may also cause flow characteristics within the valve to become unpredictable and erratic. The extreme flow characteristics may also generate unwanted noise, which in some instances may result in sound pressure levels of 110 to 170 dB three feet from the valve exit. Sound levels of this magnitude may be hazardous to those located near the fluid flow and may result in complaints from local residents.

In order to address the problems noted above, control devices have been developed which result in energy losses by sub-dividing the flow into a plurality of small passageways with abrupt turns creating friction and pressure drop in the fluid. The passageways may be provided in an annular stack of discs, which may be mounted in the fluid passage of a valve housing. A plug may be moveable within the annular structure to control the number of passageways in the stack through which fluid can flow.

Although such control devices may be useful in achieving a desired energy loss, there may be limitations associated with such conventional control devices. One particular deficiency is that the configuration of the control device may allow flow separation of a fluid flowing therethrough relative to an adjacent solid boundary under certain fluid pressure conditions. Flow separation may produce vibrational energy, which may give rise to cavitation and noise. Another drawback common in conventional control devices is that the components may be heavy, and thus, may be associated with large energy demands during operation.

Accordingly, there is a need in the art for an improved control device which addresses the issues of cavitation and vibration that may occur in conventional control devices, while also providing a lightweight design. Various aspects of the present disclosure address this particular need, as will be discussed in more detail below.

BRIEF SUMMARY

In accordance with one embodiment of the present disclosure, there is provided a valve for regulating the flow of a fluid. The valve includes a housing defining a fluid inlet and a fluid outlet. A flow control element is disposed within the housing between the fluid inlet and the fluid outlet, with the flow control element being configured to dissipate energy in a fluid flowing therethrough from the fluid inlet to the fluid outlet. A valve seat is positioned within the housing and includes a plurality of vortex generators which induce vortices in the fluid as the fluid flows through the valve seat. A plug is disposed within the housing and is moveable relative thereto between closed and open positions. The plug moves away from the valve seat as the plug moves from the closed position toward the open position such that fluid flow through the flow control element and the valve seat increases as the plug is moved from the closed position toward the open position.

The valve seat may be formed via additive manufacturing.

The plurality of vortex generators may include at least one pair of counter rotating vortex generators, co-rotating vortex generators, or straight vortex generators. The valve seat includes a first surface, a second surface, and an inner surface extending from the first surface to the second surface, the inner surface defining a central opening through which the fluid flows. Each vortex generator may extend from the inner face to define a height, wherein the height of each vortex generator adjacent the first surface differs from the height of the vortex generator adjacent the second surface. It is also possible that the entirety of each vortex generator may extend from the inner face by a uniform distance to define a uniform height.

The valve seat may be a ring extending around a central axis, with the ring having an outer surface and a plurality of holes extending into the valve seat from the outer surface.

The plug may include a first surface and a second surface opposite the first surface, with the plug having a plurality of pass-through openings between the first surface and the second surface. The plug may include a plurality of partial openings extending partially through the plug from the second surface toward the first surface. The second surface may include a concave section, with the plurality of partial openings extending from the concave section. Each of the pass-through openings and partial openings may be hexagonal.

The flow control element may include an outer surface, an inner surface defining a central opening, and a plurality of radial passageways extending between the inner surface and the outer surface. The flow control element may include a first end face, a second end face opposite the first end face, a first zone, and a second zone. The first zone may be positioned between the second zone and the first end face. The plurality of radial passageways may include a first set located in the first zone and a second set located in the second zone. The size of the radial passageways of the first set may differ from the size of the radial passageways of the second set. Each radial passageway may define a teardrop shaped opening on the outer surface. Each radial passageway may also define a quadrangular shape, such as a diamond shape. The valve may additionally include a plurality of holes extending into the flow control element from the outer surface.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

Figure 1:
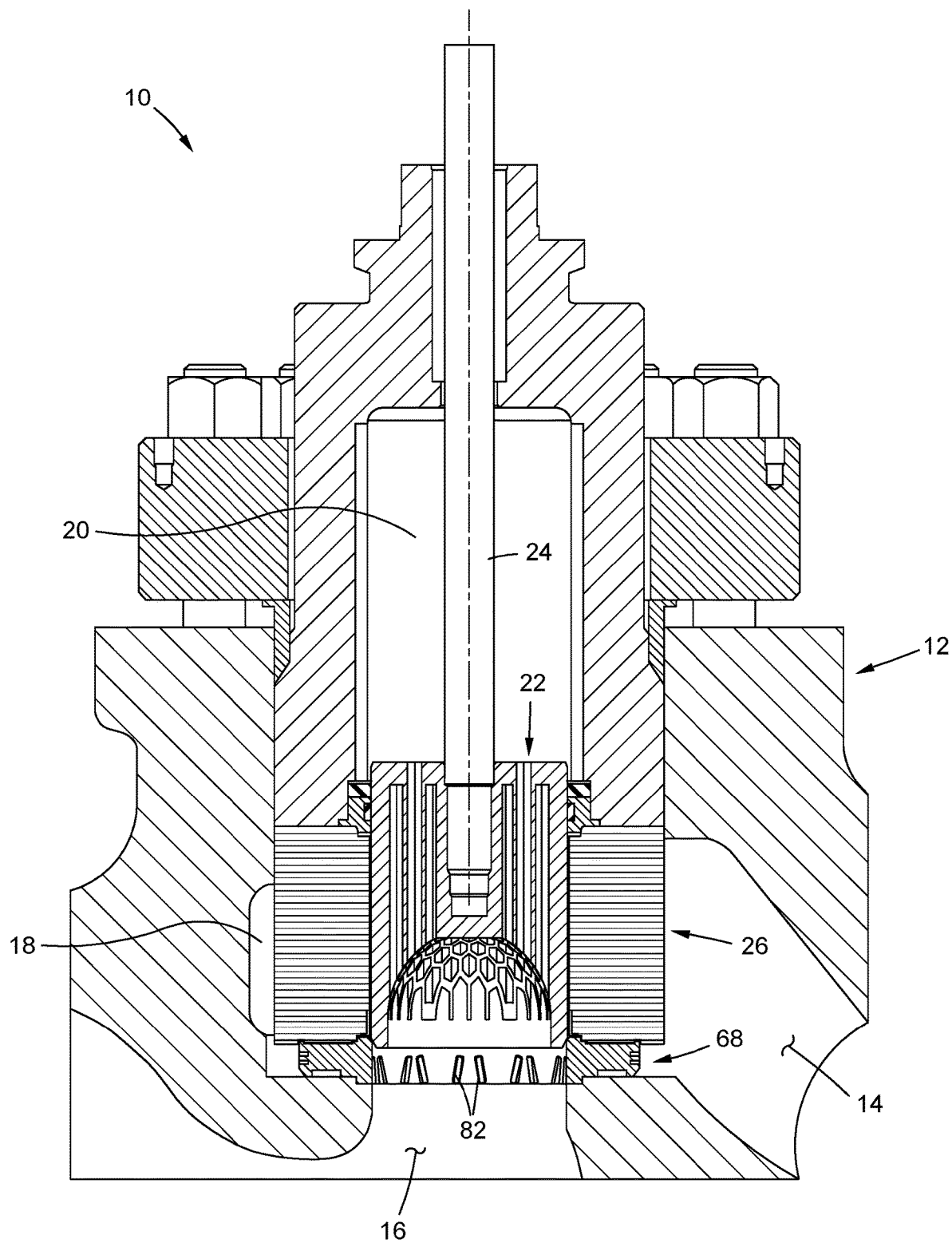
FIG. 1 is a cross sectional view of a control valve including a flow control element, plug, and valve seat constructed in accordance with an embodiment of the present disclosure.

Referring now to the drawings, wherein the showings are for purposes of illustrating preferred embodiments of the present disclosure only, and are not for purposes of limiting the same, there is depicted a control valve 10 specifically configured and adapted to impart desired flow characteristics to the fluid flowing therethrough, as well as to achieve desired thermal management characteristics of the control valve 10 using lightweight components. More specifically, the control valve 10 may include vortex generators extending into the fluid flow to impart vortices therein so as minimize flow separation from a solid boundary so as to minimizes vibration and noise within the system. The control valve 10 may additionally include thermal management holes to help in reducing the accumulation of heat within the control valve 10. Furthermore, portions of the control valve 10 may be formed from a honeycomb structure to provide a lightweight design without compromising strength. In this regard, the control valve 10 may provide advantages in relation to fluid flow, as well as thermal management, relative to conventional control valves. The thermal management provided by the control valve 10 may be advantageous during manufacturing of one or more components of the control valve 10, particularly when such manufacturing includes additive manufacturing.

Referring now specifically to FIG. 1, the control valve 10 includes a housing 12 defining a fluid inlet 14 and a fluid outlet 16. The fluid inlet 14 and the fluid outlet 16 each fluidly communicate with an interior chamber 18 defined by the housing 12. The housing 12 may also define a bore 20 which extends in an axial direction to accommodate a valve plug 22, which is connected to a valve stem 24 for actuating the valve plug 22. The valve plug 22 interfaces with a flow control element 26 to control the flow of fluid through the control valve 10 between the fluid inlet 14 and the fluid outlet 16, as will be described in more detail below.

The flow control element 26 is disposed within the interior chamber 18 of the housing 12 and is configured to dissipate energy in a fluid flowing therethrough. In the exemplary embodiment, the flow control element 26 is an annular body disposed about a central axis 27 and includes a first end face 28, an opposing second end face 30, an outer surface 32, and an inner surface 34 defining a central opening 36 extending between the first and second end faces 28, 30. The flow control element 26 may additionally include a plurality of radial passageways 38 extending between the outer surface 32 and the inner surface 34.

The radial passageways 38 may be of a specific geometrical configuration designed to achieve a desired pressure drop and to accommodate a specified flow capacity. For instance, the radial passageways 38 may be linear, or alternatively, include one or more turns or right-angle bends between the outer surface 32 and the inner surface 34. In this regard, the passageways 38 may provide multi-path, multistage fluid control, similar to DRAG® trim technology offered by Control Components, Inc. The flow control element 26 may be divided into a plurality of zones or stages along the length thereof (i.e., between the first and second end faces 28, 30). A first zone 40 may be located adjacent the first end face 28, a second zone 42 may be located adjacent the first zone 40, and a third zone 44 may be located adjacent the second zone 42, such that the second zone 42 may be positioned between the first zone 40 and the third zone 44. The radial passageways 38 within a given zone 40, 42, 44 may be similar in size and configuration, while the radial passageways 38 in different zones 40, 42, 44 may differ from each other. For instance, the radial passageways 38 in the first zone 40 may be smaller than the radial passageways 38 in the second zone 42, and the radial passageways 38 in the second zone 42 may be smaller than the radial passageways 38 in the third zone 44, and so forth.

Each radial passageway 38 may define an outer surface opening 46 at the outer surface 32 and an inner surface opening 48 at the inner surface 34. The outer surface openings 46 and the inner surface openings 48 may be teardrop shaped, although other shapes, such as oval, circular, etc., may be employed without departing from the spirit and scope of the present disclosure. In the exemplary embodiment, the tip of each teardrop is oriented so as to point toward the first end face 28, however, it is also contemplated that the orientation of the teardrop may be inverted so as to point toward the second end face 30.

In addition to the zones 40, 42, 44 noted above, the flow control element 26 may also include an auxiliary zone 45 between the third zone 44 and the second end face 30. The auxiliary zone 45 may be configured to include a multi-path, multi-stage fluid control similar to DRAG® trim technology offered by Control Components, Inc. In this regard, the auxiliary zone may include a plurality of tortuous passageways 47 extending between the outer and inner surfaces 32, 34 of the flow control element 26.

The flow control element 26 may additionally include a plurality of holes 50 extending into the flow control element 26 from the outer surface 32 thereof. According to one embodiment, the holes 50 may extend only partially through the flow control element 26 and terminate prior to reaching the inner surface 34. The holes 50 may be positioned about the circumference of the flow control element 26 and arranged in one or more circumferential sets, wherein the holes 50 in a given set are aligned along a common circumference. In the embodiment depicted in FIG. 2, a first set of holes 50 is positioned between the first end face 28 and the radial passageways 38 in the first zone 40. The flow control element 26 additionally includes two sets of holes 50 adjacent the second end face 30.

The holes 50 may aid in thermal management of the flow control element 26 by facilitating heat transfer from the flow control element 26. As will be explained in more detail below, the flow control element 26 may be formed via additive manufacturing techniques, and thus, the existence of the holes 50 may reduce the amount of material required to form the flow control element 26.

As noted above, the control valve 10 additionally includes plug 22 disposed within the housing 12 and moveable relative to the flow control element 26 between closed and open positions to control fluid flow through the flow control element 26. The plug 22 may be generally cylindrical in shape and extend around a central axis 51. The plug 22 may include a first surface 52, a second surface 54 opposite the first surface 52, and an outer wall 56 extending between the first surface 52 and at least a portion of the second surface 54. The plug 22 may additionally include a stem engagement recess 55 extending into the plug 22 from the first surface 52 to facilitate engagement between the plug 22 and the valve stem 24. The first surface 52 may be generally planar, while the second surface 54 may include an annular end portion 58, an arcuate portion 60 extending into the plug 22 from the annular end portion 58, and a central portion 62 recessed within the plug 22 relative to the annular end portion 58. The arcuate portion 60 may be concave and extend between the annular end portion 58 and the central portion 62. The plug 22 may additionally include beveled edges extending between the first surface 52 and the outer wall 56, and the annular end portion 58 of the second surface 54 and the outer wall 56.

A plurality of pass-through openings 64 may extend completely between the first surface 52 and the second surface 54. In the exemplary embodiment, the pass-through openings 64 extend from the first surface 52 to the arcuate portion 60 of the second surface 54.

The plug 22 may additionally include a plurality of partial openings 66 extending partially through the plug 22 from the second surface 54 toward the first surface 52. In the exemplary embodiment, the partial openings 66 extend from the arcuate portion 60 of the second surface 54 toward the first surface 52, and terminate short of the first surface 52. In this regard, each partial opening 66 terminates at an end wall positioned between the first surface 52 and the second surface 54.

Figure 5:
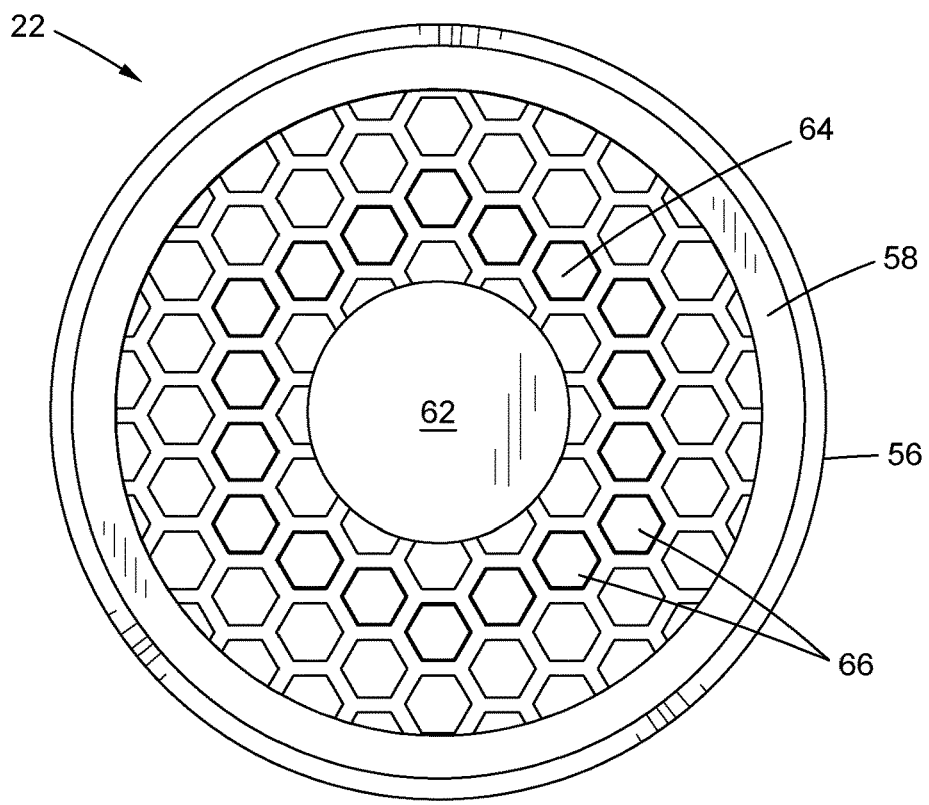
FIG. 5 is a bottom view of the plug.

Each of the pass-through openings 64 and partial openings 66 may have a peripheral configuration that is hexagonal. Furthermore, the spacing between the openings may be generally uniform, such that the pass-through openings 64 and partial openings 66 collectively define a honeycomb shape structure, as can be seen in the bottom view of FIG. 5. The honeycomb configuration may provide high strength with low weight. In particular, the honeycomb configuration along with the arcuate configuration of the second surface 54 may result in an overall weight that is 40% lower than conventional plugs machined from a solid bar or forging. The walls of the plug 22, defined by the hexagonal openings, provide support strength when pressurized, internally and externally. Furthermore, the openings 64, 66 defining the honeycomb structure provide mechanical and acoustic damping characteristics to flow-induced vibration.

The outer surface 32 of the plug 22 defines an outer diameter that is substantially equal, although slightly less than, an inner diameter of the flow control element 26 defined by the inner surface 34 thereof. In this regard, the dimensional relationship between the plug 22 and the flow control element 26 allows the plug 22 to reciprocate between closed and open positions relative to the flow control element 26. When the plug 22 is in the closed positions, the outer surface 32 of the plug 22 extends over the inner surface 34 of the flow control element 26 to block the passageways 38, 47, thereby preventing fluid flow through the blocked radial passageways 38, 47. When the plug 22 is in the open position, the plug 22 is moved into the bore 20 defined by the housing 12, to expose the passageways 38, 47 and allow for fluid flow therethrough. The plug 22 may be incrementally moved between the closed and open positions to selectively uncover the passageways 47 and 38, as will be described in more detail below.

The flow control device 26 and plug 22 may both interface with an annular valve seat 68, which is disposed within the interior chamber 18 of the housing 12. The valve seat 68 may be a ring extending around a central axis 70, and include a first surface 72, an opposing second surface 74, as well as an outer surface 76 and an inner surface 78, with both the outer and inner surfaces 76, 78 extending between the first and second surfaces 72, 74.

The inner surface 78 may define a circularly configured inner opening 80 through which fluid may flow as fluid flows through the valve seat 68 when the plug 22 is in an open position. The valve seat 68 may include a plurality of vortex generators 82 extending from the inner surface 78, with the vortex generators 82 being configured to induce vortices in the fluid as the fluid flows through the valve seat 68. Each vortex generator 82 extends outwardly from the inner surface 78 to define a vortex generator height. According to one embodiment, the height of each vortex generator 82 may vary, with one end of the vortex generator 82 defining a minimum height and the other end of the vortex generator 82 defining a maximum height. The minimum height may be disposed adjacent the first surface 72 (i.e., upstream) and the maximum height may be disposed adjacent the second surface 74 (e.g., downstream). The minimum height may be between 0.5-10 mm and the maximum height may be between 1-15 mm. Although the height of the vortex generators 82 may be variable, the height may be approximately equal to the height of the boundary layer of the fluid flowing therethrough.

Figure 2:
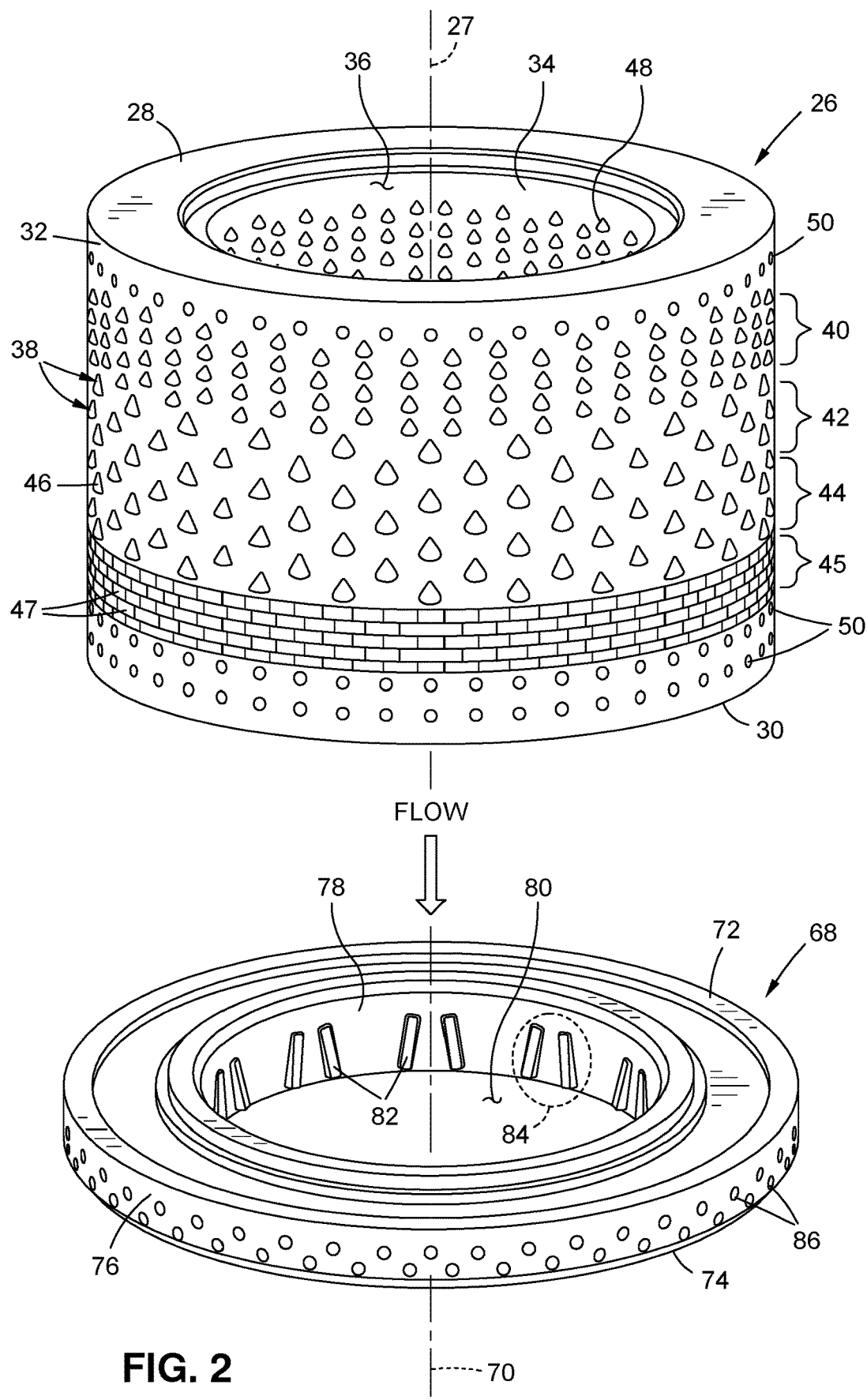
FIG. 2 is an exploded upper perspective view of the flow control element and valve seat of FIG. 1.
Figure 2A:
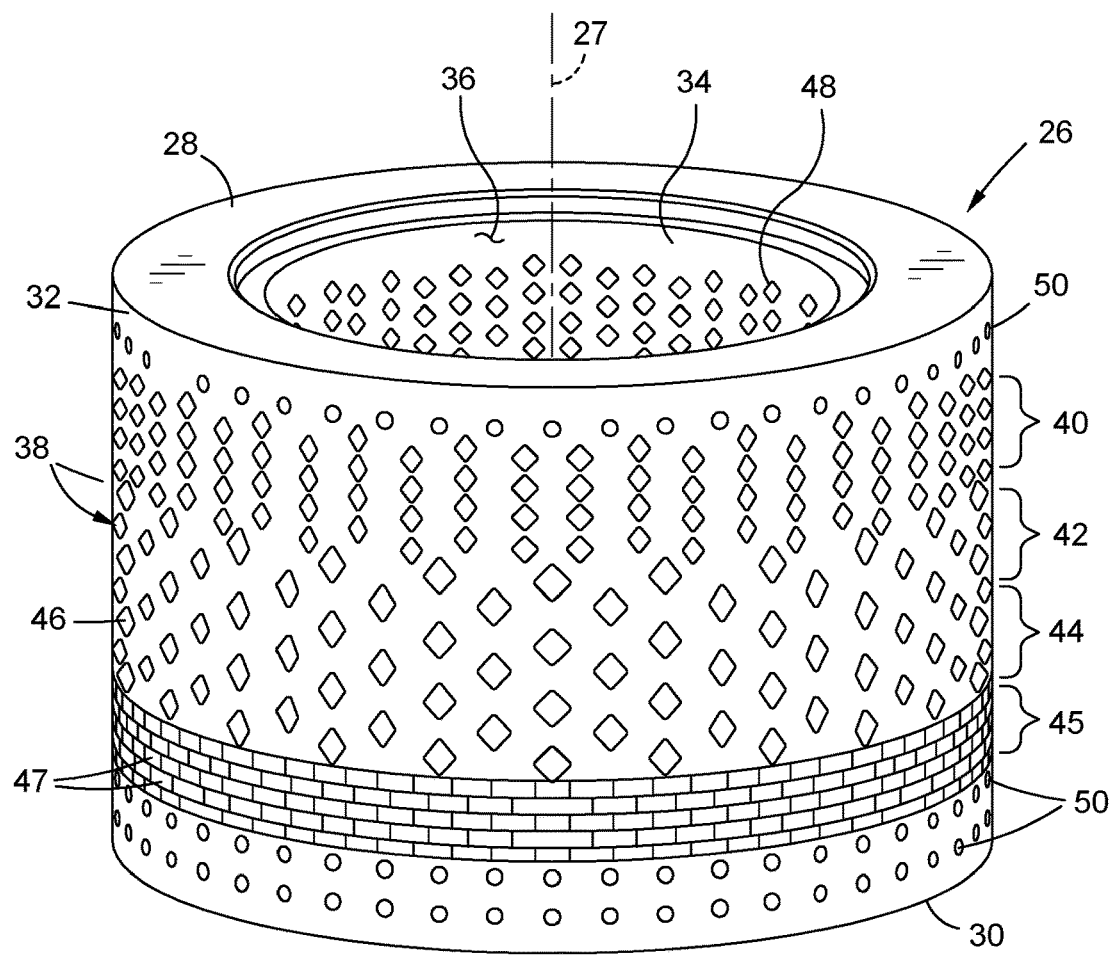
FIG. 2A is an upper perspective view of the flow control element including diamond shaped openings to radial passageways extending therethrough.

According to one embodiment, each vortex generator 82 may also be slightly angled (e.g., non-parallel) to the central axis 70. Furthermore, the plurality of vortex generators 82 may be arranged in pairs, with the vortex generators 82 in a given pair being angled in opposite directions relative to the central axis 70. FIG. 2 shows a dashed circle 84 encompassing a single pair of vortex generators 82. In this regard, as to a given pair of vortex generators 82, the distance between the vortex generators 82 may be a minimum adjacent the first surface 72, and a maximum adjacent the second surface 74.

The vortex generators 82 may impart desired fluid flow characteristics to the fluid flowing through the control valve 10 and provide several advantages. The flow characteristics imparted by the vortex generators 82 may minimize flow separation from the solid boundary due to an adverse pressure gradient. Furthermore, the counter rotating configuration of the vortex generator 82 pairs may also help force or urge fluid from the main jet toward the body contours of the housing 12, which helps to reduce flow separation. Directing the fluid toward the contours of the housing 12 defining the flow passage results in the fluid flowing against or along the surface of the housing 12 further downstream, which reduces vibrational energy from separated flow. As a result, cavitation, noise and vibration attributable to flow separation in the region downstream of the valve seat 68 may be reduced.

Figure 2B:
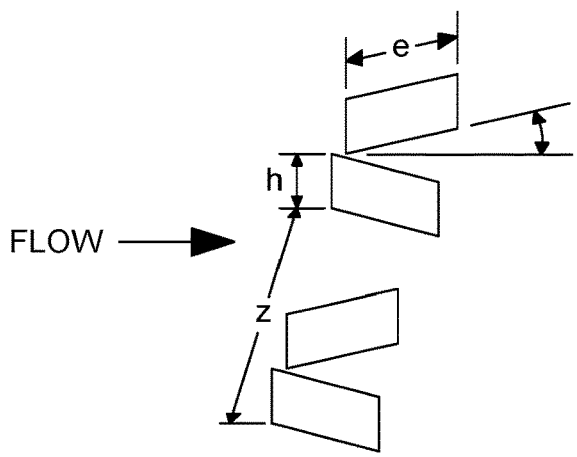
FIG. 2B is a schematic view of counter-rotating vortex generators.
Figure 2C:
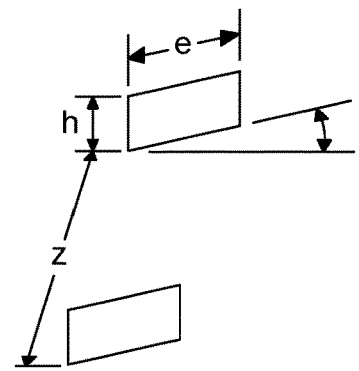
FIG. 2C is a schematic view of co-rotating vortex generators.
Figure 3:
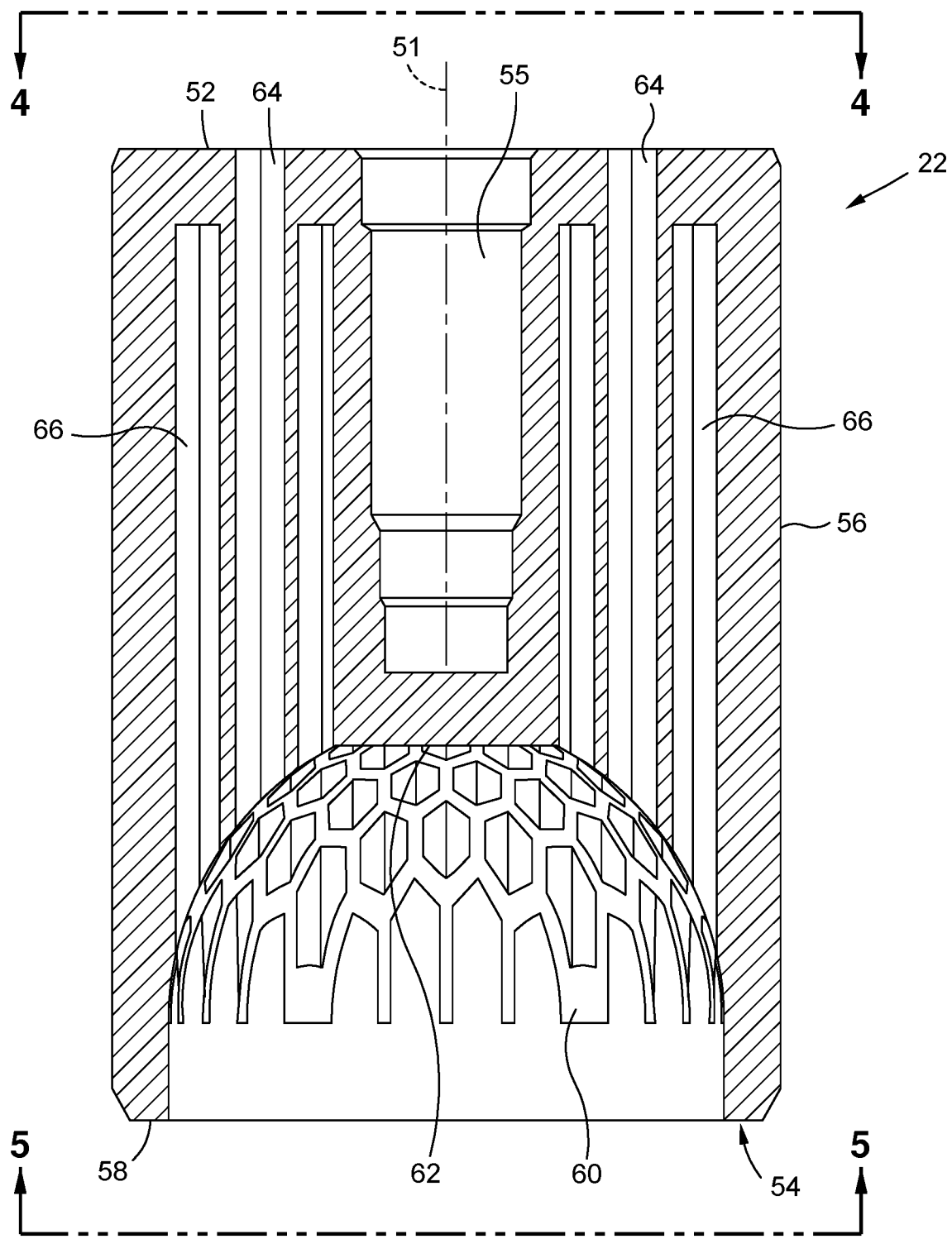
FIG. 3 is a cross sectional view of the plug of FIG. 1.
Figure 4:
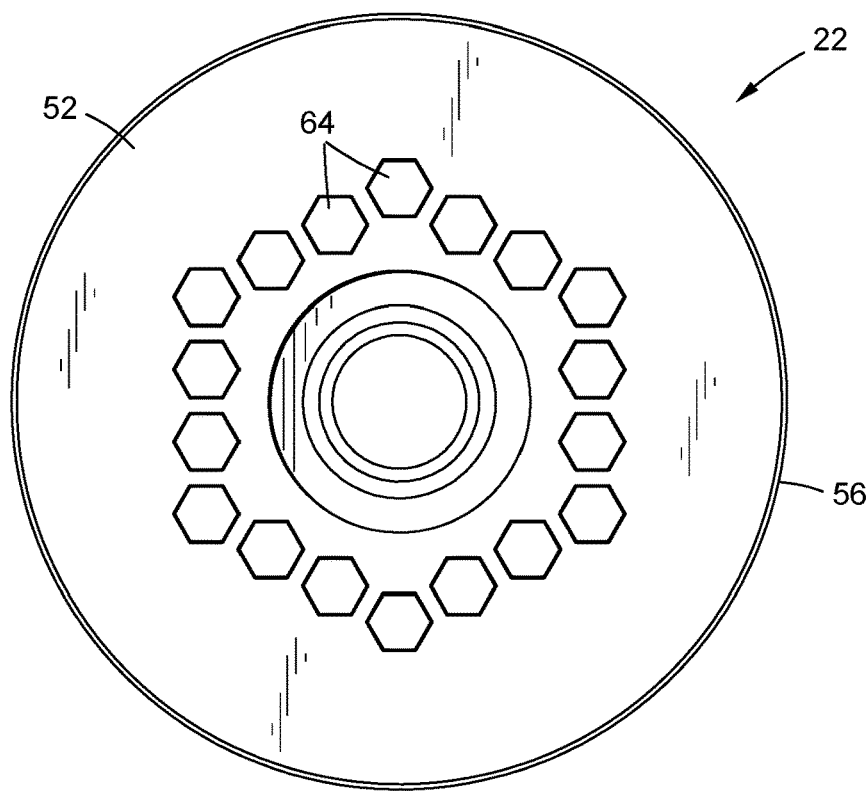
FIG. 4 is a top view of the plug.

FIGS. 2B and 2C are schematic views of different configurations of the vortex generators 82. FIG. 2B is a schematic depiction of a pair of counter-rotating vortex generators 82, wherein the vortex generators 82 extend in a non-parallel, angled configuration relative to each other. As fluid flows over the counter-rotating vortex generators, vortices may be generated that rotate in opposite directions. FIG. 2C is a schematic depiction of a pair of co-rotating vortex generators 82, which extend in a generally parallel configuration relative to each other, with both vortex generators being angled relative to the direction of fluid flow, which may be generally horizontal from the perspective depicted in FIG. 2B. As fluid flows over the co-rotating vortex generators 82, vortices may be generated that rotate in a common direction. It is noted that FIGS. 2B and 2C depict the vortex generators 82 in a given pair as being positioned slightly offset from one another, e.g., one vortex generator 82 being slightly downstream of the other vortex generator 82. It is contemplated that in other embodiments, the vortex generators 82 in a given pair may not be offset from each other relative to the fluid flow, such that the ends of the vortex generators 82 are aligned with each other, e.g., aligned along an axis generally perpendicular to the direction of flow.

The valve seat 68 may additionally include a plurality of holes 86 extending into the valve seat 68 from the outer surface 76 thereof. The holes 86 may be blind holes, and thus, may terminate before reaching surface 78. The holes 86 may be formed to enhance heat transfer from the valve seat 68 to aid in thermal management of the valve seat 68 by reducing the accumulation of heat therein. The thermal management facilitated by the holes 86 may be particularly useful when manufacturing the valve seat 68 via additive manufacturing. In the valve seat 68 shown in FIG. 2, the valve seat 68 includes a first set of holes 86 aligned along a first circumference, and a second set of holes 86 aligned along a second circumference spaced from the first circumference. The holes 86 in the second circumference are also radially offset from the holes 86 in the first circumference to create an alternating pattern.

It is contemplated that the plug 22, flow control element 26, and the valve seat 68 may be formed via additive manufacturing, which may include three-dimensional printing. In this regard, the plug 22, flow control element 26, and valve seat 68 may be formed by successively adding material layer by layer. An example of additive manufacturing that may be used to form various components of the control valve 10 is selective laser sintering, wherein a high power-density laser is used to melt and fuse powder together. The use of the laser during the formation process may generate heat, which may be dissipated via the holes 50 in the flow control element 26, as well as the holes 86 in the valve seat 68. In addition to providing thermal management benefits, the incorporation of the holes 50, 86 may also result in a reduction in the use of material and printing time.

In use, the control valve 10 may be operative to control fluid flow through the housing 12 between the fluid inlet 14 and the fluid outlet 16. When the plug 22 is in the closed position, a distal end portion of the plug 22 (e.g., that portion adjacent the second surface 54) may be in contact with the valve seat 68, and the outer surface 56 of the plug 22 may extend over the radial passageways 38 in the first, second, and third zones 40, 42, 44, as well as the tortuous passageways 47 in the auxiliary zone 45 so as to restrict fluid flow through the flow control element 26.

As the plug 22 is moved away from the closed position, away from the valve seat 68, the plug 22 is moved into the bore 20 in the valve housing 12, and the passageways positioned closest to the valve seat 68 may become exposed. In the embodiment depicted in FIG. 2, the tortuous passageways 47 in the auxiliary zone 45 are closest to the valve seat 68, and thus, would become exposed first. Accordingly, fluid may flow through the passageways 47, while the remaining passageways 38 in the first, second, and third zones 40, 42, 44 may remain covered and blocked from fluid flow.

As the plug 22 continues toward the open position, the plug 22 moves further into the bore 20, thereby uncovering the passageways 38 in the third zone 44, while the passageways in the second zone 42 and first zone 40 remain covered. The plug 22 may further advance toward the open position, so as to uncover the passageways 38 in the second zone 42, along with those passageways 38 previously uncovered in the third zone 44, and the passageways 47 in the auxiliary zone 45. Finally, as the plug 22 is moved into the completely open position, all of the passageways 38 in the first, second, and third zones 40, 42, 44 are uncovered, along with the passageways 47 in the auxiliary zone 45.

Movement of the plug 22 from the completely open position toward the closed position may occur in the reverse order, albeit in a similar incremental fashion to selectively cover or uncover the passageways 38, 47 in the various zones 40, 42, 44, 45. The pass-through openings 64 in the plug 22 may allow for a pressure balance on opposite sides of the plug 22 to allow for ease in moving the plug 22 between the closed and open positions.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A valve for regulating the flow of a fluid, the valve comprising:
   a housing defining a fluid inlet and a fluid outlet;
   a flow control element disposed within the housing between the fluid inlet and the fluid outlet, the flow control element being configured to dissipate energy in a fluid flowing therethrough from the fluid inlet to the fluid outlet; and
   a plug disposed within the housing and having a first surface, an opposing second surface, a plurality of pass-through openings extending through the plug from the first surface to the second surface and a plurality of partial openings extending partially through the plug from the second surface toward the first surface, the plug being moveable relative to the housing between closed and open positions, fluid flow through the flow control element increasing as the plug is moved from the closed position toward the open position.

2. The valve recited in claim 1, wherein the second surface includes a concave section, the plurality of partial openings extending from the concave section.

3. The valve recited in claim 1, wherein each of the pass-through openings and partial openings are hexagonal.

4. The valve recited in claim 1, wherein the flow control element includes an outer surface, an inner surface defining a central opening, and a plurality of radial passageways extending between the inner surface and the outer surface.

5. The valve recited in claim 4, wherein the flow control element includes a first end face, an second end face opposite the first end face, a first zone and a second zone, the first zone being positioned between the second zone and the first end face, the plurality of radial passageways including a first set located in the first zone and a second set located in the second zone, the size of the radial passageways of the first set differing from the size of the radial passageways of the second set.

6. The valve recited in claim 5, wherein each radial passageway defines a teardrop shaped opening on the outer surface.

7. The valve recited in claim 4, further comprising a plurality of holes extending into the flow control element from the outer surface.

8. The valve of claim 1, further comprising:
a valve seat positioned within the housing and having a plurality of vortex generators which induce vortices in the fluid as the fluid flows through the valve seat;
the plug moving away from the valve seat as the plug moves from the closed position toward the open position such that fluid flow through the flow control element and the valve seat increases as the plug is moved from the closed position toward the open position.

9. The valve recited in claim 8, wherein the valve seat is formed via additive manufacturing.

10. The valve recited in claim 8, wherein the plurality of vortex generators includes at least one pair of counter rotating vortex generators.

11. The valve recited in claim 8, wherein the valve seat includes a first surface, a second surface, and an inner surface extending from the first surface to the second surface, the inner surface defining a central opening through which the fluid flows, each vortex generator extending from the inner face to define a height, wherein the height of each vortex generator adjacent the first surface differs from the height of the vortex generator adjacent the second surface.

12. The valve recited in claim 8, wherein each valve seat is a ring extending around a central axis, the ring having an outer surface and a plurality of holes extending into the valve seat from the outer surface.

* * * * *